(12) United States Patent  (10) Patent No.: US 8,209,668 B2
Bartik et al.  (45) Date of Patent: Jun. 26, 2012

(54) METHOD AND SYSTEM FOR MEASURING THE PERFORMANCE OF A COMPUTER SYSTEM ON A PER LOGICAL PARTITION BASIS

(75) Inventors: Jane H. Bartik, Poughkeepsie, NY (US); Michael Billeci, Poughkeepsie, NY (US); Lisa C. Heller, Rhinebeck, NY (US); Donald G O'Brien, Poughkeepsie, NY (US); Bruce Wagar, Tempe, AZ (US); Patrick M. West, Jr., Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1374 days.

(21) Appl. No.: 11/468,353

(22) Filed: Aug. 30, 2006

(65) Prior Publication Data

US 2008/0059121 A1  Mar. 6, 2008

(51) Int. Cl.
*G06F 9/44* (2006.01)
*G06F 9/46* (2006.01)
*G06F 9/455* (2006.01)

(52) U.S. Cl. ........ 717/127; 717/128; 717/130; 717/131; 718/1; 718/100; 718/102; 718/103; 718/104

(58) Field of Classification Search .................. None
See application file for complete search history.

(56) References Cited

U.S. PATENT DOCUMENTS

| | | | |
|---|---|---|---|
| 5,652,853 A * | 7/1997 | Duvalsaint et al. | 711/203 |
| 5,802,354 A | 9/1998 | Kubala et al. | |
| 6,178,534 B1 | 1/2001 | Day et al. | |
| 6,209,106 B1 | 3/2001 | Kubala et al. | |
| 6,681,240 B1 * | 1/2004 | Armstrong et al. | 718/104 |
| 6,865,688 B2 | 3/2005 | Dawkins et al. | |
| 6,920,587 B2 | 7/2005 | Dawkins et al. | |
| 7,020,761 B2 | 3/2006 | Siegel et al. | |
| 7,412,492 B1 * | 8/2008 | Waldspurger | 709/216 |
| 2002/0087611 A1 * | 7/2002 | Tanaka et al. | 709/1 |
| 2003/0061540 A1 * | 3/2003 | Lee et al. | 714/31 |
| 2003/0097393 A1 * | 5/2003 | Kawamoto et al. | 709/1 |
| 2005/0044169 A1 | 2/2005 | Arbeitman et al. | |
| 2005/0071838 A1 | 3/2005 | Hatasaki | |
| 2006/0123217 A1 * | 6/2006 | Burdick et al. | 711/173 |
| 2007/0067366 A1 * | 3/2007 | Landis | 707/205 |

OTHER PUBLICATIONS

IBM Technical Disclosure Bulletin. Processor Architecture for Measurement and Monitoring Functions. [EAST Search] (Feb. 1, 1990). IBM, pp. 1-7. Retrieved From USPTO EAST Database.*

* cited by examiner

*Primary Examiner* — Emerson Puente
*Assistant Examiner* — Jonathan R Labud
(74) *Attorney, Agent, or Firm* — Scully, Scott, Murphy & Presser, P.C.; John E. Campbell

(57) ABSTRACT

Disclosed are a method and system for measuring the performance of individual logical partitions of a logically partitioned computer system. Preferably, the method and system both hardware and firmware to allow measurement samples to be collected only for user specified zones of interest. In one embodiment, the method comprises the steps of specifying a Zone or Zones of interest (a Zone being a logical partition), collecting measurement samples only from the one or more specified Zones of interest, and measuring the performance of each of these Zones using only the measurement samples collected from said each of the Zones.

20 Claims, 2 Drawing Sheets

METHOD AND SYSTEM FOR MEASURING THE PERFORMANCE OF A COMPUTER SYSTEM ON A PER LOGICAL PARTITION BASIS

BACKGROUND OF THE INVENTION

1. Field of the Invention

This invention generally relates to measuring performance of a computer system. More specifically, the invention relates to measuring performance of a logically partitioned computer system on a per logical partition basis.

2. Background Art

Logical partitioning (LPAR) is a system structure which allows a symmetric multiprocessor (SMP) system to be subdivided into "partitions", also known as "zones", each of which contains the necessary processor, memory, and input/output (I/O) resources to run an operating system (OS) image. LPAR provides easy redeployment of computing resources to support changing workloads without the need for physical restructuring, flexible growth to accommodate increased workloads, and large, scalable single-system-image enterprise systems.

Because LPAR breaks the traditional model of one operating system running on one hardware platform, LPAR generates the need for a set of platform management functions that operate outside the scope of any single operating system image. This need has been met by the introduction of a set of platform management functions implemented in firmware and hardware.

These platform management functions have been implemented in a firmware hypervisor with underlying support from millicode, i390, and hardware. The hypervisor is a firmware resident application, or set of applications, that manages virtual machines and logical partitions. The hypervisor is responsible for many aspects of partition management including allocating resources to a partition, installing an operating system in a partition, starting and stopping the operating system in a partition, dumping main storage of a partition, communicating between partitions, and other partition management functions.

As an example, one logically partitionable computer system that has achieved widespread commercial success is the Zseries eServer offered by the International Business Machines Corporation, Armonk, N.Y.

In order to get the maximum performance out of a computer system, that performance may be monitored and measured. The results of these measurements can be used to modify the hardware, firmware, and software design to improve future performance. With a logically partitioned computer system, performance measurement teams often have access to only a single zone. The workloads to be measured are dispatched on Logical Processors within this Zone. For this reason, the measurement teams are only interested in the performance data collected while the hardware is executing on behalf of the Zone or Zones of Interest (ZOI).

As a more specific example, instrumentation and sampling is the name given to the mechanism used to measure the performance of the IBM zSeries eServers. This task is achieved by repeatedly executing "workload" instruction streams (often segments of actual customer workloads targeted to stress particular hardware/software functions) and collecting data relevant to the system's performance. Initially hardware captures selected signals and stores them in hardware arrays. Each group of these selected signals is called a Sample. When enough Samples are captured to fill the arrays, firmware (zSeries millicode and i390 code) is invoked to move the data from the arrays to storage. A rich set of controls allows the user (a measurement team member) great flexibility in selecting which signals are captured and when the selected data is captured. This data is later used for the analysis of important metrics such as CPI (cycles per instruction), cache misses/hits, pipeline stalls, etc.

Since the data-capturing hardware exists on each physical processor, historically, the data has been collected and stored on a per-physical-processor basis. A buffer area in storage was allocated for each physical processor, and the data from each processor was stored in its own dedicated buffer. Thus, Instrumentation data was collected for the entire machine, including all Zones on every measurement. To allow a measurement team to identify the data that was collected while the hardware was executing on behalf of the ZOI, the current Zone Number was included in each Sample. After the measurement had finished, the data underwent further processing to include only data pertinent to the ZOI.

There are three major drawbacks to this method. Firstly, a large amount of storage (which is costly) is required to store data for the entire machine. The latest zSeries machines can have as many as 64 physical processors installed. The ZOI could, for example, run on a single physical processor, thus, only one byte in 64 would be of interest with the remainder ultimately being discarded. Secondly, additional machine and human resources are utilized during the filtering step. Lastly, running with Instrumentation active has performance and RAS impacts. Although these impacts are relatively small, it would be preferable for the Instrumentation measurement to have no impact outside of the ZOI. In implementations to date, all Zones are running with Instrumentation active; therefore all Zones suffer these impacts.

SUMMARY OF THE INVENTION

An object of this invention is to measure performance of a logically partitioned computer system on a per logical partition basis.

Another object of the present invention is to provide a method and system for measuring the performance characteristics of a logical partition of a computer system independent of the other logical partitions running on the same hardware.

A further object of the invention is to allocate a buffer in storage for each logical processor in the ZOI of a logically partitioned computer system, and to store in the buffer or buffers allocated for each logical processor, only the measurement data that is captured while the hardware is executing on behalf of the ZOI.

These and other objectives are attained with a method and system for measuring the performance of individual Zones of a logically partitioned computer system. Preferably, the method and system use both hardware and firmware to allow measurement samples to be collected only for user-specified ZOI. A buffer in storage is allocated for each Logical Processor in the ZOI. Only the data that is captured while the hardware is executing on behalf of these Zone(s) is stored. On exit from a ZOI, the Instrumentation state is saved so that upon entry back into that same Zone, Instrumentation is resumed using the saved state.

In one embodiment, the method comprises the steps of specifying a Zone or Zones of interest (a Zone being a logical partition, collecting measurement samples only from the one or more specified Zones of interest, and measuring the performance of each of these Zones using only the measurement samples collected from said each of the Zones.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

In accordance with the present invention, a mechanism is provided for measuring the performance of a logically partitioned computer system on a per Zone (logical partition) basis. The mechanism, in one embodiment, is comprised of both hardware and firmware to allow measuring samples to be collected only for a user-specified zone of interest (ZOI). A buffer in storage is allocated for each virtual Processor in each ZOI. Only the data that is captured while the hardware is executing on behalf of these Zones' Virtual Processors is stored. On exit from a ZOI, the Instrumentation state is saved so that, upon entry back into that ZOI, Instrumentation is resumed with using the saved state.

Figure 1:
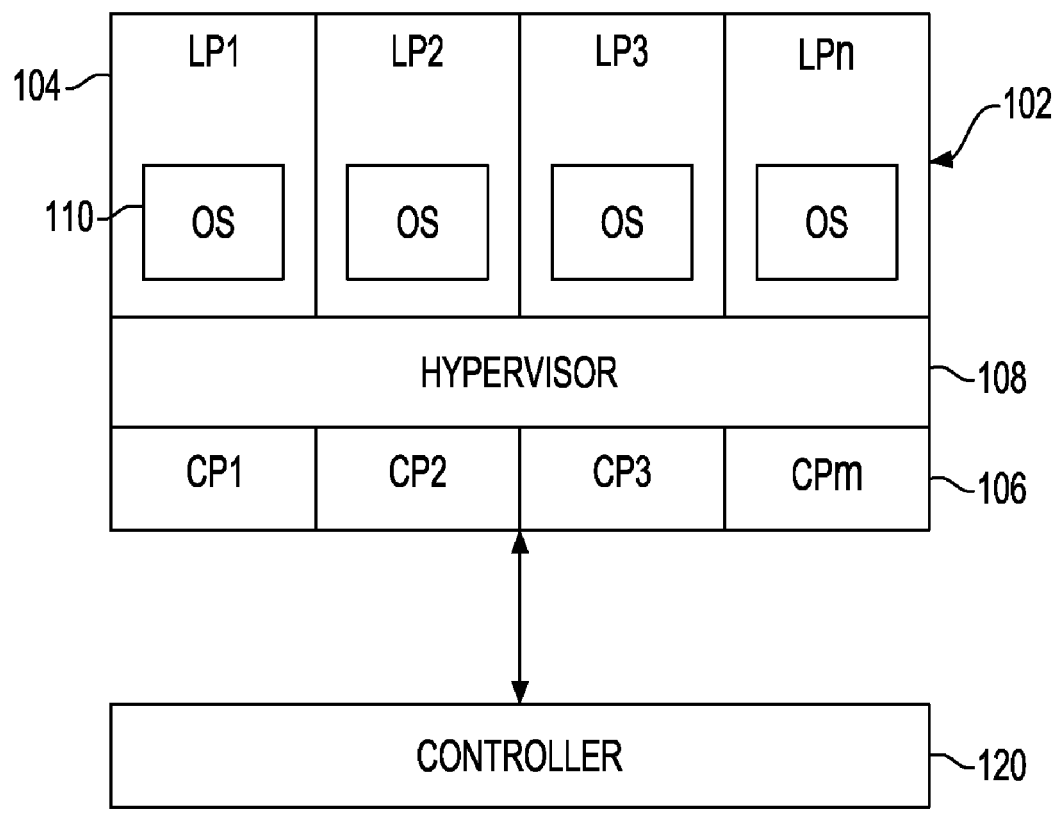
FIG. 1 illustrates a computing environment incorporating the present invention.

FIG. 1 illustrates, as an example, one suitable computing environment 100 in which the present invention is used. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. (IBM® is a registered trademark of International Business Machines Corporation, Armonk, N.Y., U.S.A. Other names used herein may be registered trademarks, trademarks or product names of International Business Machines Corporation or other companies.) In one example, a computing environment based on the z/Architecture includes an eServer zSeries offered by International Business Machines Corporation, Armonk, N.Y.

As one example, computing environment 100 includes a central processor complex (CPC) 102 coupled to a controller 120. Central processor complex 102 includes, for instance, one or more partitions 104 (e.g., logical partitions LP1 LPn), one or more central processors 106 (e.g., CP1 CPm), and a hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete computer system, but in reality, only a portion of it is available. A combination of hardware and Licensed Internal Code (commonly referred to as microcode) keeps a program in a logical partition from interfering with a program in a different logical partition. This allows several different logical partitions to operate on a single physical processor in a time sliced manner. In this particular example, each logical partition has a resident operating system 110, which may differ for one or more logical partitions. In one embodiment, operating system 110 is the z/OS operating system offered by International Business Machines Corporation, Armonk, N.Y.

Central processors 106 are physical processor resources that are allocated to the logical partitions. For instance, a logical partition 104 includes one or more logical processors, each of which represents all or a share of a physical processor resource 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors. One example of hypervisor 108 is the Processor Resource/Systems Manager (PRISM), offered by International Business Machines Corporation, Armonk, N.Y.

Controller 120, which is coupled to the central processor complex, includes centralized logic responsible for arbitrating between different processors issuing requests. For instance, when controller 120 receives a request, it determines that the requester is the master processor for that request and that the other processors are slave processors, it broadcasts messages; and otherwise, handles requests.

Figure 2:
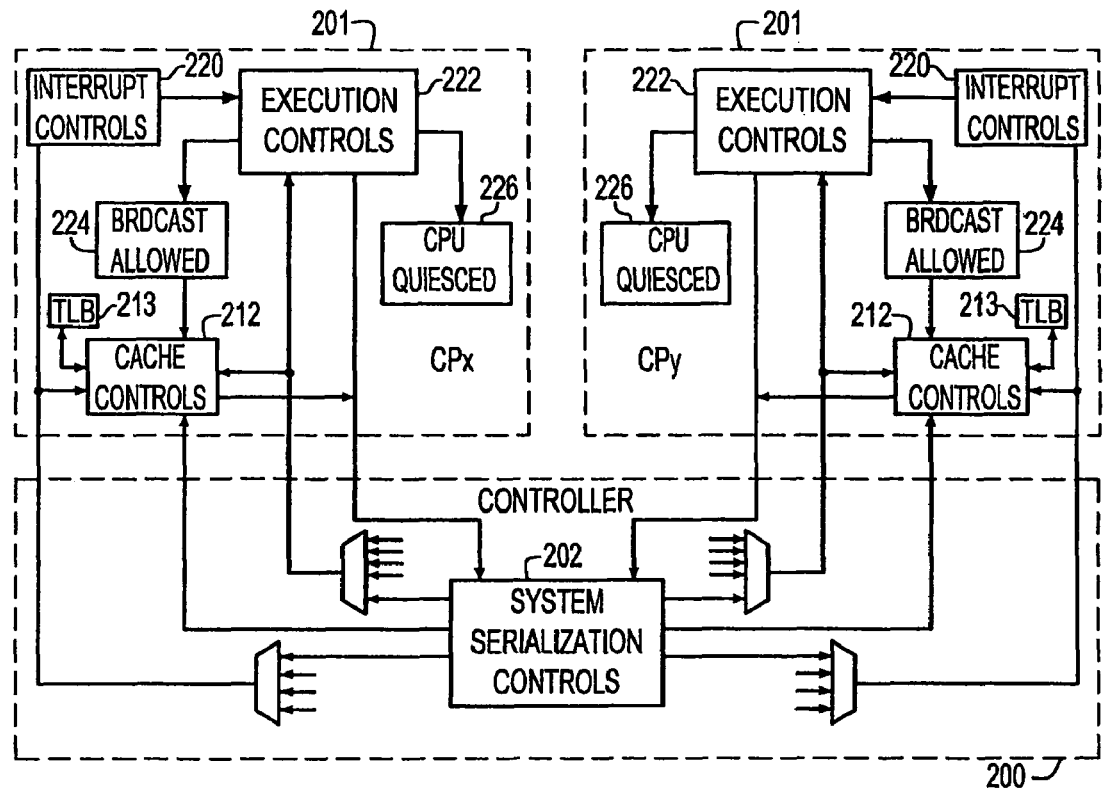
FIG. 2 shows the controller of FIG. 1 in more detail.

FIG. 2 depicts one example of a controller 200 coupled to a plurality of central processors (CPUs) 201. In this example, only two central processors are depicted. However, it will be understood that more than two processors may be coupled to controller 200.

Controller 200 includes various controls including, for instance, system serialization controls 202. The system serialization controls are used to insure that operations that are to be serialized are serialized. It also monitors the sequence of events for that operation.

Controller 200 is coupled to each central processor via various interfaces. For instance, an interface 204 is used by the Licensed Internal Code in a central processor to send "control" commands to the controller, which specifies an action to be taken, and to send "sense" commands, which return information from the controller. Another interface is a response bus 206, which is used to return information to the controller for the "sense" commands. The response bus is also used to communicate command status for "control" commands, and may be set from a plurality of sources within the controller, including the system serialization controls. A central processor can use this interface to sense the state of the system serialization controls in controller 200.

A further interface is interface 208, which is used by the controller to send commands to each CPU. This may also be controlled from a plurality of sources within the controller, including system serialization controls 202. A yet further interface is interface 210, which provides signals to cache controls 212 of central processor 201. Cache controls 212 process commands, in response to the signals. In one example, cache controls 212 process commands that affect one or more buffers.

In addition to cache controls 212, central processor 201 includes various other controls, including; for instance, interrupt controls 220 and execution controls 222. In response to particular events, interrupt controls 220 cause an internal interruption to be pending in the CPU, which in turn, causes execution controls 222 to suspend program instruction processing, at the next interruptible point. In response to the interruption, an execution control 222 invokes a Licensed Internal Code routine to set a broadcast operation allowed latch 224 to enable cache controls 212 to process pending commands. Central processor 201 also includes a CPU quiesced latch 226 that indicates whether or not the central processor is quiesced.

The above-described computing environment is only one example. Many variations are possible without departing from the spirit of the present invention. For example, one or more partitions can be running in different architecture modes. Further, as one example, the environment need not be based on the z/Architecture, but instead, can be based on other architectures offered by Intel, Sun Microsystems, as well as others. Moreover, an environment may include an emulator (e.g., software or other emulation mechanisms), in which a particular architecture or a subset thereof is emulated. In such an environment, one or more emulation functions of the emulator can implement one or more aspects of the present invention, even though a computer executing the emulator may have a different architecture than the capabilities being emulated.

In order to obtain maximum performance from a computer system, such as system 100, that performance may be monitored and measured. As mentioned above, with a logically partitioned computer system, performance measurement teams often have access to a single zone (logical partition). The workloads to be measured are dispatched on virtual Processors within this Zone. For this reason, the measurement teams are only interested in the performance data collected while the hardware is executing on behalf of the Zone or Zones of Interest (ZOI). In accordance with the present invention, computer environment 100 is provided with a mechanism, comprised of both hardware and firmware, to allow measuring samples to be collected only for the user specified ZOI. A buffer in storage is allocated for each virtual Processor in each ZOI. Only the data that is captured while the hardware is executing on behalf of these Zones' Virtual Processors is stored. On exit from a ZOI, the Instrumentation state is saved so that upon entry back into that ZOI Instrumentation is resumed with using the saved state.

Samples are collected in one of two general modes, Time-Based or Event-Based. For Time-Based Sampling, Samples are collected at regular intervals in time according to a user-defined Sample rate. For Event-Based Sampling, a Sample is collected on each occurrence of a user-specified event (such as any taken branch); when enough Samples have been taken to fill the hardware arrays, collection is suspended until the end of a user-specified time interval, whereupon collection resumes on the next event. To achieve Zone Based Sampling, both modes need to be able to measure time in terms of Time-In-Zone as opposed to wall-clock time. Unfortunately, the existing hardware timers do not easily facilitate this requirement since they cannot be read to determine the time remaining in the interval.

One preferred solution has dedicated hardware support, including timers that can be read and written, to allow firmware to quickly suspend Instrumentation, save the state, and, later, re-enable Instrumentation from the saved state. This solution minimizes the impact to Zones which are not of interest to instrumentation.

In an alternate solution, utilizing existing hardware, Instrumentation is enabled globally on all processors, regardless of the zone they are running. When the hardware arrays are filled, an interrupt is presented to millicode, which determines if we are in a ZOI. If so, the Samples are stored in the appropriate buffer. Upon exit from a ZOI, Instrumentation continues to run, however, when an interrupt occurs, the millicode routine does not store any Samples.

Having Instrumentation continue to run while not in a ZOI allows the time intervals to be managed appropriately. The time remaining in the interval cannot be read from the hardware, preventing millicode from being able to properly save and restore the state across exit and re-entry from a ZOI. Ignoring this deficiency, and simply resetting the interval upon entry, would lead to biased data, which is highly undesirable. Instead, we allow Samples to continue to be taken at regular intervals (even while not in a ZOI), so that we get a uniform distribution of Sample points rather than a skewed distribution.

This implementation eliminates the storage impacts to Zones, which are not of interest, but does not address the RAS concerns.

Figure 3:
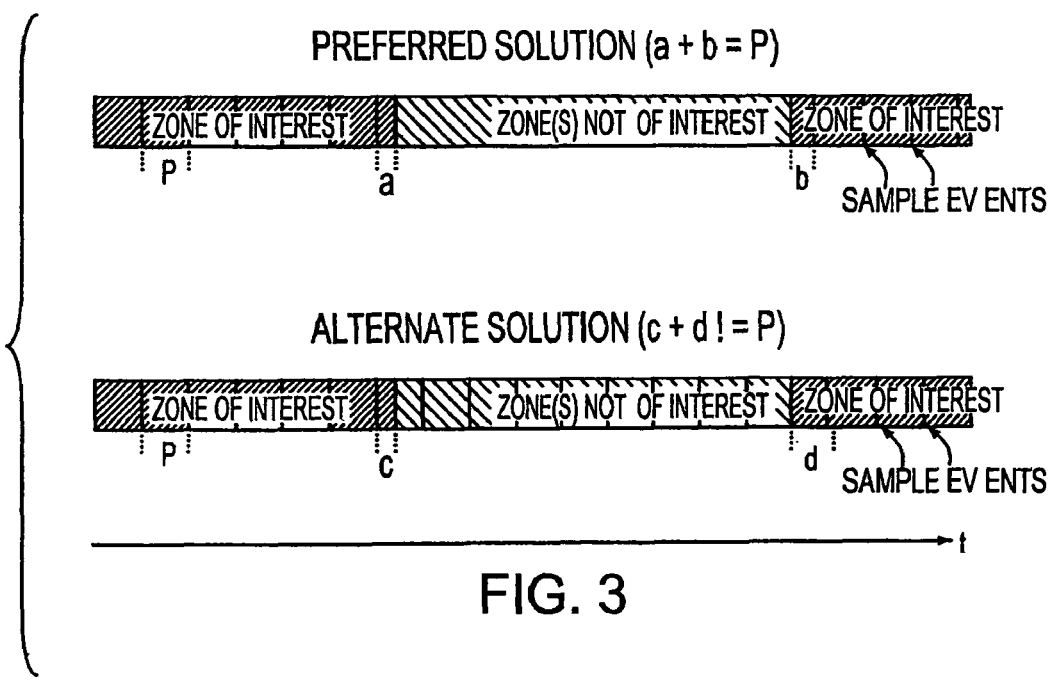
FIG. 3 shows timelines for two implementations of the present invention.

FIG. 3 shows the time lines for two similar scenarios under the two implementations. In the diagram, time, labeled "t", proceeds from left to right. Sampling events are denoted by vertical marks on the time lines. A Sampling Event is either a single sample in Time-Based mode or a group of Samples in Event-Based mode. The period of time between Sampling Events is a constant, the Sampling Period, labeled "P". The value of "P" is the reciprocal of the user specified Sample Rate.

At the beginning of both scenarios, the processor is executing on behalf of a ZOI. Then, it switches into a Zone, which is not of interest to Instrumentation. Finally, it switches back into the ZOI. The difference between the two scenarios can be seen by examining the time in Zone between Samples, which span the Zone changes.

It is possible that the Zone changes could occur exactly on Sampling Period boundaries. However, since the two events are in no way correlated, there is no reason to believe that this case will occur frequently. Further, if this special case were guaranteed to always occur, no special handling would be necessary. Therefore, we concentrate on the more frequent and troublesome case, in which a Zone change occurs at some arbitrary point within a Sampling Period.

In the preferred solution, the exit from the ZOI occurs at a time which is not exactly on a Sampling Period boundary. The time since the last Sampling Event and the Zone change is represented by the interval "a". At this point, millicode reads the value in the dedicated hardware timer, which is the time remaining in Sampling Period; this value is saved along with the rest of the Instrumentation state.

Millicode then stops Instrumentation and execution continues in the new Zone, which is not of interest. During this time, Instrumentation is not running, and no Sampling Events occur. Thus, millicode is not invoked to handle Instrumentation interrupts.

Upon reentry into the ZOI, millicode retrieves the saved state, including the value of the time remaining in the Sampling Period. This value is loaded back into the dedicated hardware timer. Execution then continues in the ZOI until the timer times out, triggering another Sampling Event. The interval between reentering the ZOI and the Sampling Event is labeled "b" in the diagram. Note that, since a+b=P, the time in Zone between Samples is equal to the Sampling Period.

In the Alternate Solution, represented in FIG. 3, the exit from the ZOI, again, occurs at a time which is not exactly on a Sample Period boundary. The time since the last Sampling Event and the Zone change is represented by the interval "c". At this time, millicode saves the Instrumentation state, but it is not able to save the value of the time remaining in the Sampling Period, and Instrumentation continues to run.

While executing in the new Zone, which is not of interest, Sampling Events continue to occur, and millicode is invoked to handle Instrumentation interrupts. Upon an Instrumentation interrupt, millicode determines that the current Zone is not of interest and does not store the Samples which have been collected.

Upon reentry into the ZOI, millicode retrieves the saved state, which does not include the time remaining in the Sampling Period. Reentry occurs at a time which is not exactly on a Sampling Period boundary; a portion of the current Sampling Period has already passed. Execution proceeds in the ZOI until the current Sampling Period expires, which triggers another Sampling Event. In the diagram, the interval between reentering the ZOI and the Sampling Event is labeled "d". Note that, in this case, c+d!=P; the time in Zone between the Samples, which span the Zone changes, is not equal to the Sampling Period.

However, in this alternate method, the interval labeled "c" and the interval label "d" can take on arbitrary values between zero and the Sampling Period, "P". Over a large number of Zone changes, we expect these intervals to average one half of the Sampling period (½ P). So, for a typical performance measurement run involving a great many Zone changes, on average, c+d=½ P+½ P=P.

It should be noted that the present invention, or aspects of the invention, can be embodied in a computer program product, which comprises features enabling the implementation of methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of measuring performance of a logically partitioned computer system on a per logical partition basis, the method comprising the steps of:
    specifying, in the computing system, a Zone or Zones of interest, said Zone or each of said Zones being a logical partition of the computer system and being associated with one or more processing units, and wherein the one or more processing units associated with each of said zones exit and enter said each zone;
    for each of said zones of interest, collecting, in the computing system, performance data from the one or more processing units associated with said each zone of interest; and
    measuring, in the computing system, the performance of each of the Zones of interest based on the performance data collected from the one or more processing units associated with said each zone of interest and collected only when said one or more processing units associated with said each zone of interest are in said each zone of interest.

2. A method according to claim 1, wherein the collecting step includes the steps of:
    allocating a buffer in storage for each logical processor within the specified Zone or Zones of interest; and
    storing the measurement samples collected from each of the logical processors in the buffer allocated to said each of the logical processors.

3. A method according to claim 2, wherein the collecting step includes the farther steps of:
    suspending measurement of the performance of each of the logical processors of the specified Zone or Zones of interest at specified times; and
    saving the state of each of the logical processors of the specified Zone or Zones of interest when the measurement of the performance of said each of the logical processors is suspended.

4. A method according to claim 3, wherein the collecting step includes the further step of, after the saving state, later re-enabling measurement of the performance of said each of the logical processors from the saved state.

5. A method according to claim 2, wherein the storing step includes the step of storing the measurement samples collected from each of the logical processors in the buffer allocated to said each of the logical processors at specified times.

6. A method according to claim 5, wherein the collecting step includes the step of collecting the measurement samples at regular intervals.

7. A system for measuring performance of logically partitioned computer system on a per logical partition basis, the system comprising:
    a memory device;
    at least one processor in communication with the memory device and configured to:
        specify a Zone or Zones of interest on the computer system having one or more of the logical partitions, said Zone or each of said Zones being a logical partition of the computer system and being associated with one or more processing units, and wherein the one or more processing units associated with each of said zones exit and enter said each zone;
        for each of said zones of interest, collect performance data from the one or more processing units associated with said each zone of interest; and
    measure the performance of the Zones of interest based on the performance data collected from the one or more processing units associated with said each zone of interest and collected only when said one or more processing units associated with said each zone of interest are in said each zone of interest.

8. A system according to claim 7, further comprising:
    a plurality of buffers in storage, a respective one of said buffers being allocated for each logical processor in the specified Zone or Zones of interest; and the processor is further configured to:
    store the measurement samples collected from each of the logical processors in the buffer allocated to said each of the logical processors.

9. A system according to claim 8, wherein to collect the measurement samples, the processor is further configured to:
    suspend measurement of the performance of each of the logical processors of the specified Zone or Zones of interest at specified times; and
    save the state of each of the logical processors of the specified Zone or Zones of interest when the measurement of the performance of said each of the logical processors is suspended.

10. A system according to claim 9, wherein to collect the measurement samples, the processor is further configured to re-enable measurement of the performance of said each of the logical processors from the saved state.

11. A system according to claim 8, wherein the processor is further configured to store the measurement samples collected from each of the logical processors in the buffer allocated to said each of the logical processors at specified times.

12. A system according to claim 11, wherein to collect the measurement samples, the processor is further configured to collect the measurement samples at regular intervals.

13. A program storage device readable by machine, tangibly embodying a program of instructions executable by the machine to perform method steps for measuring performance of logically partitioned computer system on a per logical partition basis, the method steps comprising:

specifying a Zone or Zones of interest, said Zone or each of said Zones being a logical partition of the computer system and being associated with one or more processing units, and wherein the one or more processing units associated with each of said zones exit and enter said each zone;

for each of said zones of interest, collecting performance data from the one or more processing units associated with said each zone of interest; and measuring the performance of each of the Zones of interest based on the performance data collected from the one or more processing units associated with said each zone of interest and collected only when said one or more processing units associated with said each zone of interest are in said each zone of interest.

14. A program storage device according to claim 13, wherein the collecting step includes the steps of:

allocating a buffer in storage for each logical processor of the specified Zone or Zones of interest; and storing the measurement samples collected from each of the logical processors in the buffer allocated to said each of the logical partitions.

15. A program storage device according to claim 14, wherein the collecting step includes the further steps of:

suspending measurement of the performance of each of the logical processors of the specified Zone or Zones of interest at specified times; and saving the state of each of the logical processors of the specified Zone or Zones of interest when the measurement of the performance of said each of the logical processors is suspended.

16. A program storage device according to claim 15, wherein the collecting step includes the further step of; after the saving state, later re-enabling measurement of the performance of said each of the logical processors from the saved state.

17. A program storage device according to claim 14, wherein the storing step includes the step of storing the measurement samples collected from each of the logical partitions processors in the buffer allocated to said each of the logical processors at specified times.

18. A program storage device according to claim 17, wherein the collecting step includes the step of collecting the measurement samples at regular intervals.

19. The method according to claim 1, further comprising:

representing a time between a last measurement sample in the one or more of specified Zone of interest before the exiting and a moment of the exiting as a first interval;

representing a time between a moment of the re-entering and a first measurement sample after the re-entering as a second interval, wherein an addition of the first interval and the second interval is equal to a sampling period of the collecting the measurement samples.

20. The method according to claim 1, further comprising:

continuing the collecting the measurement samples upon exiting the one or more of specified Zones of interest; and not storing the measurement samples collected from the exiting to the re-entering.

* * * * *